United States Patent
Shimizu et al.

(10) Patent No.: US 7,468,848 B2
(45) Date of Patent: Dec. 23, 2008

(54) FIXING METHOD FOR RESIN LENS

(75) Inventors: Kunihiko Shimizu, Saitama (JP); Makoto Iikawa, Saitama (JP); Kazunori Komori, Tokyo (JP); Koji Minami, Kanagawa (JP)

(73) Assignees: Hoya Corporation, Tokyo (JP); Zeon Corporation, Tokyo (JP)

( * ) Notice: Subject to any disclaimer, the term of this patent is extended or adjusted under 35 U.S.C. 154(b) by 0 days.

(21) Appl. No.: 11/741,837

(22) Filed: Apr. 30, 2007

(65) Prior Publication Data

US 2007/0258155 A1 Nov. 8, 2007

(30) Foreign Application Priority Data

May 2, 2006 (JP) .............................. 2006-128494

(51) Int. Cl.
*G02B 7/02* (2006.01)
(52) U.S. Cl. .................. 359/811; 359/819; 359/704
(58) Field of Classification Search .......... 359/811–823
See application file for complete search history.

(56) References Cited

U.S. PATENT DOCUMENTS 6,678,096 B2 * 1/2004 Sugi et al. .................. 359/719
6,781,729 B2 * 8/2004 Suzuki et al. ............... 359/205
2005/0007680 A1 * 1/2005 Naganuma et al. .......... 359/704

FOREIGN PATENT DOCUMENTS

| JP | 5 11157 | 1/1993 |
| JP | 8 36124 | 2/1996 |
| JP | 2001 105499 | 4/2001 |
| JP | 2002 10117 | 1/2002 |
| JP | 2004 20867 | 1/2004 |
| JP | 2006-281611 | 10/2006 |

OTHER PUBLICATIONS

English language Abstract of JP 5-11157.
English language Abstract of JP 8-36124.
English language Abstract of JP 2001-105499.
English language Abstract of JP 2002-10117.
English language Abstract of JP 2004-20867.
English Language Abstract of JP 2006-281611.

* cited by examiner

*Primary Examiner*—Mohammed Hasan
(74) *Attorney, Agent, or Firm*—Greenblum & Bernstein, P.L.C.

(57) ABSTRACT

A fixing method for a resin lens in which a resin lens element is fixed to a resin lens frame, includes forming the resin lens element and the resin lens frame using amorphous polyolefin as a resin material therefor; forming an abutting surface in each of the resin lens element and the resin lens frame so as to mutually abut against each other; abutting the resin lens element and the resin lens frame mutually against each other at the abutting surfaces thereof; and laser welding the abutting surfaces to each other by irradiating a laser beam thereon.

9 Claims, 3 Drawing Sheets

FIXING METHOD FOR RESIN LENS

BACKGROUND OF THE INVENTION

1. Field of the Invention

The present invention relates to a fixing method for a resin lens.

2. Description of the Prior Art

In recent years, mobile devices, such as mobile phones, having a camera installed therein have been increasingly common. In such a camera, it is common practice to fix a lens to a lens frame thereof using a UV adhesive. Specifically, the lens is fixed to the lens frame by irradiating ultraviolet light onto the UV adhesive which as been applied between the lens and the lens frame, and the UV adhesive accordingly is cured by this ultraviolet light.

Since the pixel pitch is small due to the camera provided in a mobile device being very small, the positional precision required in the lens frame when fixing the lens to the lens frame is extremely high.

However, if a UV adhesive is used, when the UV adhesive is being cured, since the UV adhesive contracts, the position of the lens with respect to the lens frame shifts out of alignment. If the lens position shifts out of alignment, the required positional precision for the lens cannot be attained (satisfied), which in turn deteriorates the quality of an image captured by the camera.

SUMMARY OF THE INVENTION

The present invention provides a fixing method for a resin lens which can be fixed to a lens frame with high positional precision.

According to an aspect of the present invention, a fixing method is provided for a resin lens in which a resin lens element is fixed to a resin lens frame, including forming said resin lens element and said resin lens frame using amorphous polyolefin as a resin material therefor; forming an abutting surface in each of the resin lens element and the resin lens frame so as to mutually abut against each other; abutting the resin lens element and the resin lens frame mutually against each other at the abutting surfaces thereof; and laser welding the abutting surfaces to each other by irradiating a laser beam thereon.

It is desirable for the mutually abutting surfaces to include a first abutting surface formed on a peripheral edge portion of the resin lens element and extending in a direction orthogonal to an optical axis of the resin lens element, and a second abutting surface formed on an inner surface of the resin lens frame and extending in the direction orthogonal to the optical axis of the resin lens element, wherein the laser beam is irradiated onto the first and second abutting surfaces upon transmitting through the resin lens element.

It is desirable for the abutting surfaces to include a first abutting surface formed on the outer circumferential surface of the resin lens element and extending in a direction parallel to an optical axis of the resin lens element, and a second abutting surface formed on an inner surface of the resin lens frame and extending in the direction parallel to the optical axis, wherein the laser beam is irradiated onto the first and second abutting surfaces upon transmitting through irradiation holes formed in the resin lens frame, and the resin lens element.

It is desirable for the irradiation holes to be provided in the resin lens frame at locations in a circumferential direction about the optical axis.

It is desirable for the irradiation holes to extend in radial directions on a common plane orthogonal to the optical axis and aligned with the fixing position of the resin lens element.

Before the abutting surfaces are laser welded, it is desirable for a position of the resin lens element in the optical axis direction is adjustable over a range in which the irradiation holes and the resin lens element overlap each other in the optical axis direction.

It is desirable for the resin lens element and the resin lens frame to both have a rotationally symmetric shape centered on an optical axis of the resin lens element.

It is desirable for the amorphous polyolefin, for forming the resin lens element and the resin lens frame, to be a cycloolefin polymer.

It is desirable for a laser source which irradiates the laser beam to include one of a YAG laser source, an LD laser source and a $CO_2$ laser source.

According to the present invention, since an amorphous polyolefin lens is laser welded to an amorphous polyolefin lens frame, positional misalignment of the lens with respect to the lens frame does not occur, unlike in the case where UV adhesive is used, and the amorphous polyolefin lens can be fixed to the amorphous polyolefin lens frame with high positional precision. Moreover, since amorphous polyolefin has almost no water-absorbing properties, there is also the advantage of the amorphous polyolefin lens having negligible changes in optical quality upon a change in humidity.

Furthermore, since it is not necessary to provide space for an adhesive in the lens frame, further miniaturization thereof can be achieved, and the lens frame can be further strengthened. Furthermore, the fixing strength can also be increased compared to that of UV adhesive.

The present disclosure relates to subject matter contained in Japanese Patent Application No. 2006-128494 (filed on May 2, 2006) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
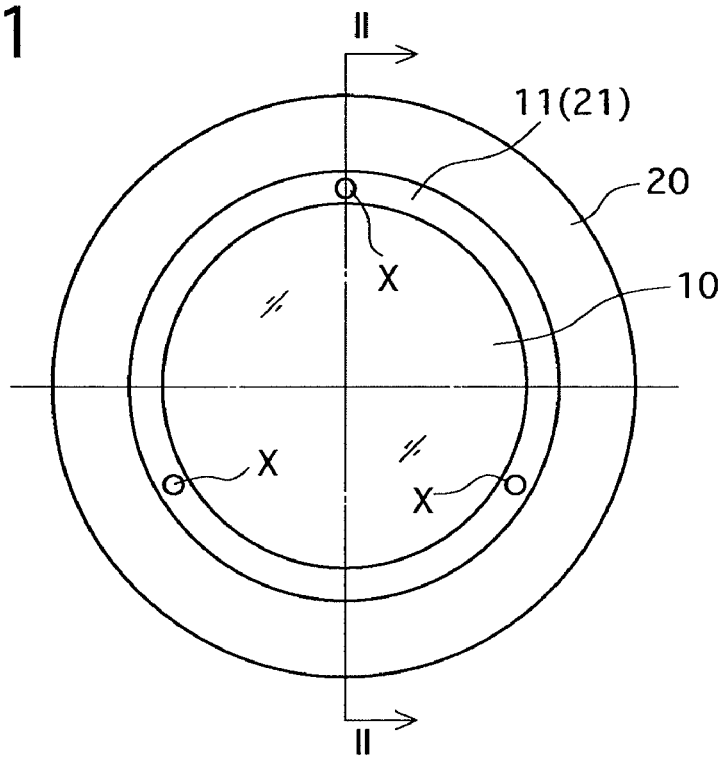
FIG. 1 shows a front elevational view of a lens and a lens frame in a first embodiment of a fixing method for a resin lens, according to the present invention.
Figure 2:
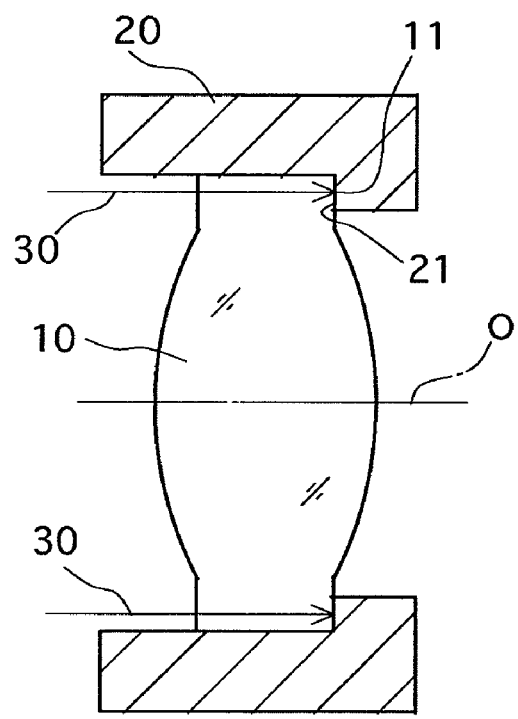
FIG. 2 shows a cross sectional view of the first embodiment taken across the II-II line of FIG. 1.

FIGS. 1 and 2 illustrate a first embodiment of a fixing method for a resin lens according to the present invention. A resin lens element 10 is made of amorphous polyolefin, and has a rotationally symmetric shape centered on an optical axis O. A resin lens frame 20 is made of amorphous polyolefin with a carbon material incorporated therein, and is dark in color due to the influence of the carbon material. The resin lens frame 20 also has a rotationally symmetric shape centered on the optical axis O. The outer diameter of the resin lens element 10 and the inner diameter of the resin lens frame 20 (the inner diameter positioned in front of an annular abutting surface (restricting portion) 21) are determined so that the resin lens element 10 fits into the resin lens frame 20. The resin lens element 10 is provided, on the peripheral edge portion thereof, with an annular abutting surface 11 which is orthogonal (normal to) the optical axis O of the resin lens element 10. The resin lens frame 20 is provided, on the inner surface thereof (i.e., on the front surface of an inner flange portion thereof), with an annular abutting surface (restricting portion) 21 which is also orthogonal (normal to) the optical axis O and corresponds to the annular abutting surface 11.

Upon the resin lens element 10 being fixed to the resin lens frame 20, the resin lens element 10 is fitted inside the resin lens frame 20, and the annular abutting surface 11 abuts against the annular abutting surface 21. This mutually abutting position of the annular abutting surface 11 and the annular abutting surface 21 designates a fixing position for the resin lens element 10 with respect to the resin lens frame 20. In this fixing position, upon a YAG laser beam 30 (from a YAG laser source) being irradiated from the resin lens element 10 side, the laser beam 30 transmits through the resin lens element 10 and reaches the annular abutting surface 21. The irradiation arrangement of the laser beam 30 is such that the resin lens element 10 is the resin material through with the laser beam 30 is transmitted and the resin lens frame 20, which has a carbon material incorporated therein, is the resin material which absorbs the laser beam 30. Since a carbon material is added in the resin lens frame 20, upon the laser beam 30 reaching the annular abutting surface 21, a part of the laser beam 30 reflects off the annular abutting surface 21 and the remainder of the laser beam 30 is absorbed through the annular abutting surface 21. Consequently, heat is generated at the annular abutting surface 21 so as to melt the annular abutting surface 21, and this heat is transferred to the annular abutting surface 11. Accordingly, the annular abutting surface 11 also melts so that a fusion pool is formed at which the transmission resin material (i.e., the resin lens element 10) mixes with the absorption resin material (i.e., the resin lens frame 20) at both the annular abutting surface 11 and the annular abutting surface 21. Thereafter, upon turning off the irradiation of the laser beam 30, this fusion pool cools, and hence welds the annular abutting surface 11 of the resin lens element 10 to the annular abutting surface 21 of the resin lens frame 20. The irradiation position of the laser beam 30 is set at a plurality of positions in the circumferential direction about the optical axis O in order to securely and reliably fix the resin lens element 10 to the resin lens frame 20. It is desirable for the laser beam 30 to be set at three positions at equi-angular intervals (intervals of 120°) as shown by the three X's in FIG. 1 (four or more positions are also desirable). The energy level (intensity, diameter and irradiation time, etc.) of the laser beam 30 is appropriately determined so as to achieve the above-described function.

In the first embodiment, if a fitting clearance in the radial direction between the resin lens element 10 and the resin lens frame 20 is set to a relatively large amount, there is the advantage of being able to adjust the optical axis position (in a direction orthogonal to the optical axis) of the resin lens element 10 in a state where the annular abutting surface 11 abuts against the annular abutting surface 21. The resin lens element 10 can be fixed at the adjusted position by irradiating the laser beam 30 after carry out this optical axis adjustment.

Figure 3:
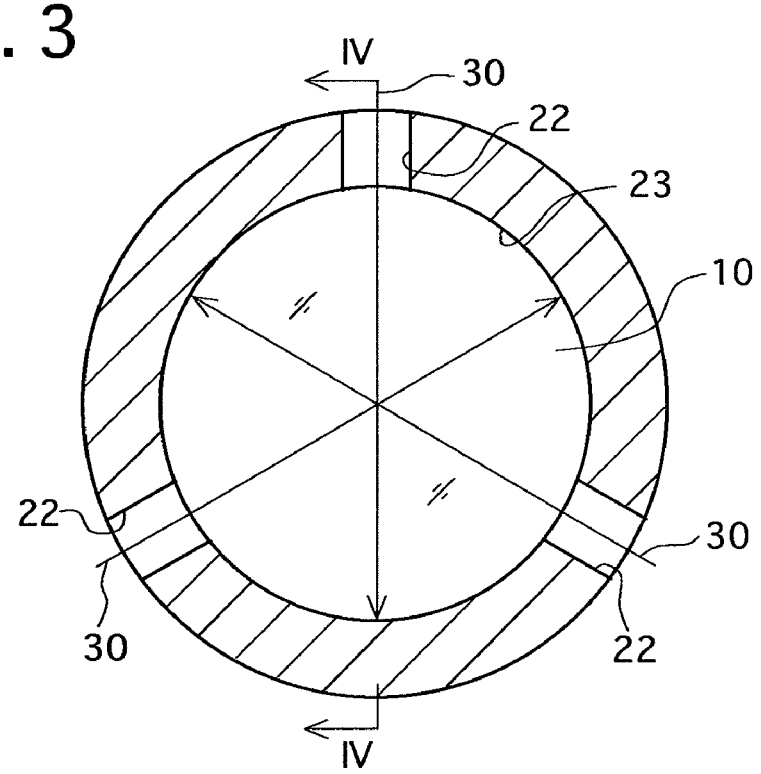
FIG. 3 shows a cross sectional view of a lens and a lens frame in a second embodiment of a fixing method for a resin lens, according to the present invention.
Figure 4:
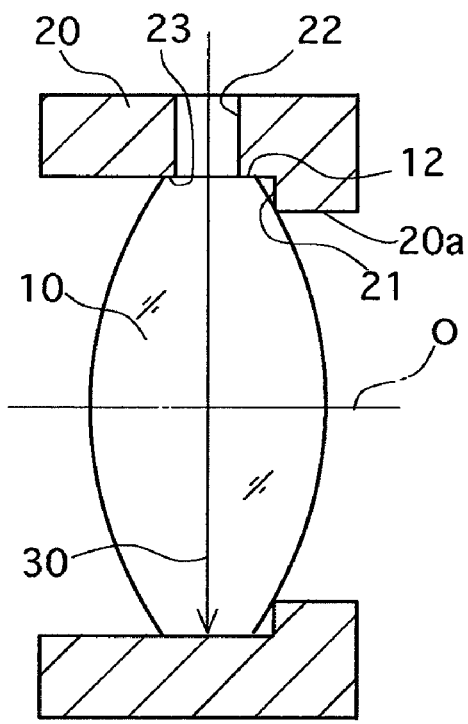
FIG. 4 shows a cross sectional view of the second embodiment taken across the IV-IV of FIG. 3.

FIGS. 3 and 4 illustrate a second embodiment of a fixing method for a resin lens according to the present invention. Similar to the first embodiment, a resin lens element 10 of the second embodiment is made of amorphous polyolefin and has a rotationally symmetric shape centered on an optical axis O. Furthermore, similar to the first embodiment, a resin lens frame 20 of the second embodiment is made of amorphous polyolefin with a carbon material incorporated therein and has a rotationally symmetric shape centered on the optical axis O. The outer diameter of the resin lens element 10 and the inner diameter of the resin lens frame 20 (the inner diameter positioned in front of an annular abutting surface (restricting portion) 21) are determined so that the resin lens element 10 fits into the resin lens frame 20. A annular abutting surface 21, which determines an movement extremity (stopping position) of the resin lens element 10 (relative to the resin lens frame 20) in the optical axis direction, is formed on the inner surface of the resin lens frame 20. However, the resin lens element 10 does not have a annular abutting surface 11 for abutting against the annular abutting surface 21 like in the first embodiment; rather, an inner circumferential edge portion (a ridge which connects a rear-end inner circumferential surface 20a of the resin lens frame 20 with the annular abutting surface 21) of the annular abutting surface 21 abuts against the rear surface of the resin lens element 10 in the vicinity near the outer periphery thereof. The resin lens frame 20 is further provided with a plurality of irradiation holes 22 (at three positions at equi-angular intervals (intervals of 120°) in the illustrated embodiment) formed so as to extend in radial directions on a common plane orthogonal to the optical axis O and aligned with the fixing position of the resin lens element 10.

In the second embodiment, by determining the fixing position of the resin lens element 10 within the resin lens frame 20, with respect to the optical axis direction, and irradiating the laser beam 30 through the irradiation holes 22, the resin lens element 10 can be laser welded inside the resin lens frame 20 in a similar manner to the first embodiment. Namely, likewise with the first embodiment, the resin lens element 10 is the resin material via which the laser beam 30 is transmitted, the resin lens frame 20 is the resin material in which the laser beam 30 is absorbed, a fusion pool occurs at the abutting surfaces (an outer circumferential surface (abutting surface) 12 which is parallel to the optical axis of the resin lens element 10 and an inner circumferential surface (abutting surface) 23 which is parallel to the optical axis O of the resin lens frame 20) in the circumferential direction thereof, and laser welding occurs thereat.

Note that as shown in FIGS. 3 and 4, in the second embodiment, the laser beam 30 is irradiated in a direction orthogonal to the optical axis O, however, the irradiating direction of the laser beam 30 can be inclined at an angle sharper than 90° without being orthogonal to the optical axis O so long as the laser beam 30 transmits through the irradiation holes 22 and the resin lens element 10 so as to reach the inner circumferential surface (abutting surface) 23 of the resin lens frame 20.

In the second embodiment, the annular abutting surface (restricting portion) 21 determines the movement extremity of the resin lens element 10 in the optical axis direction thereof (in the right direction in FIG. 4). However, the second embodiment has the advantage of being able to fix the resin lens element 10 to the resin lens frame 20 even if the resin lens element 10 does not abut against the annular abutting surface 21 so long as the irradiation holes 22 and the outer peripheral edge surface of the resin lens element 10 are positioned so as to overlap each other in the optical axis direction (i.e., be aligned in a plane orthogonal to the optical axis O). In other words, upon assembly, there is the advantage of the resin lens element 10 being able to be fixed at the adjusted position after the position of the resin lens element 10 in the optical axis direction is adjusted in the resin lens frame 20, after which the laser beam 30 is irradiated so as to laser weld the resin lens element 10 to the resin lens frame 20. Furthermore, it is possible to likewise fix the resin lens element 10 at the adjusted position even if the irradiation holes 22 and the outer peripheral edge surface of the resin lens element 10 are positioned so as to not overlap each other in the optical axis direction, so long as the laser beam 30, which irradiates at an angle less than 90° from the optical axis O (i.e., not orthogonal to the optical axis O), irradiates through the irradiation holes 22, thereafter transmits through the resin lens element 10 from the rear surface (or front surface) of the resin lens element 10 and reaches the inner circumferential surface (abutting surface) 23 of the resin lens frame 20.

Figure 5:
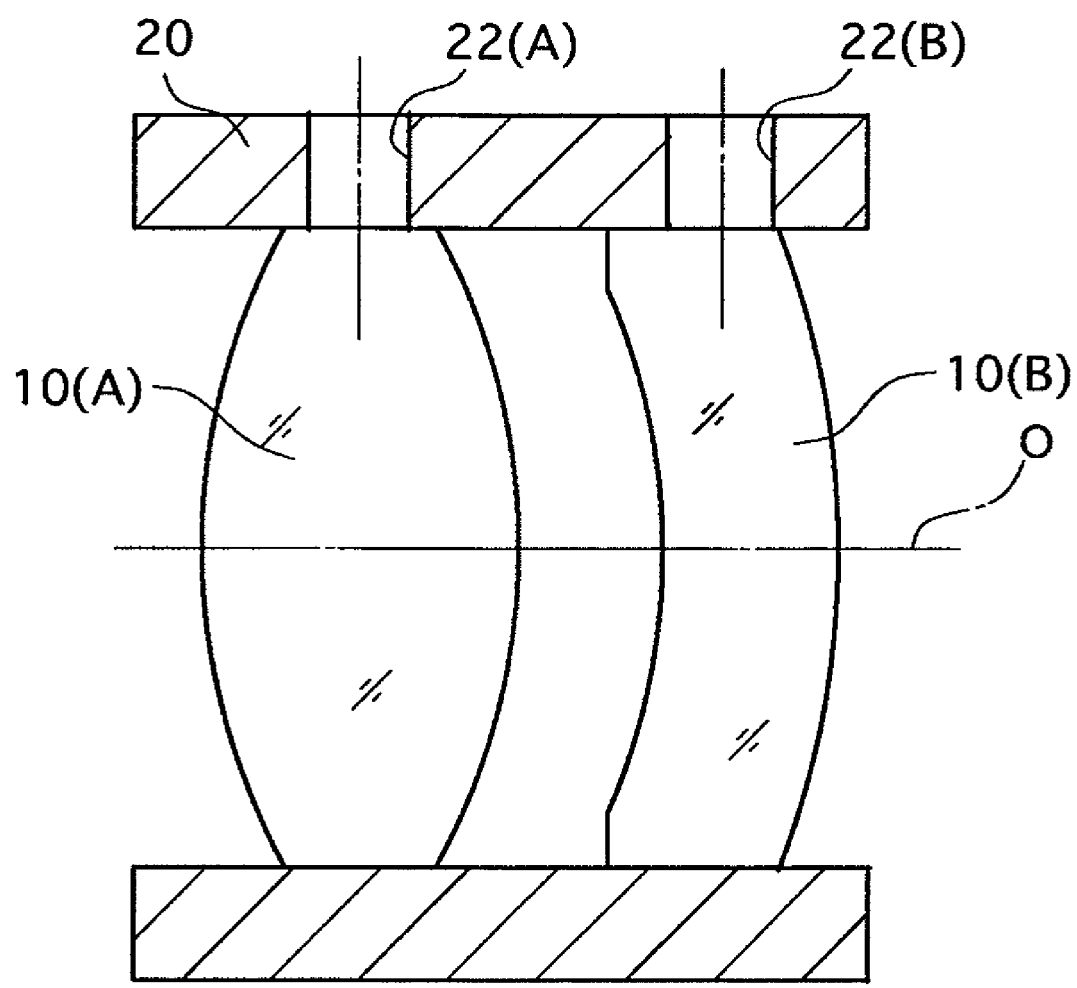
FIG. 5 shows a cross sectional view of two lenses and a lens frame in a third embodiment of a fixing method for a resin lens, according to the present invention.

FIG. 5 shows a third embodiment of the present invention in which the above advantages of the second embodiment are further utilized. An inner circumferential surface, which extends parallel to the optical axis O, of a resin lens frame 20 of the third embodiment is not provided with an annular abutting surface (restricting portion) which would otherwise prevent movement of the resin lens element 10 in the optical axis direction. In the third embodiment, two resin lens elements, i.e., a resin lens element 10(A) and a resin lens element 10(B) are inserted inside the resin lens frame 20. Two sets of irradiation holes, i.e., irradiation holes 22(A) and irradiation holes 22(B), are formed in the resin lens frame 20 and correspond with the resin lens element 10(A) and the resin lens element 10(B), respectively. In the third embodiment, the adjustable positions in the optical axis direction of the resin lens element 10(A) and the resin lens element 10(B) can be set at a relatively large range.

In the third embodiment, in a similar manner to that of the second embodiment, even if the irradiation holes 22(A) and 22(B) and the outer peripheral edge surface of the resin lens elements 10(A) and (B) are positioned so as to not overlap each other in the optical axis direction, respectively, the resin lens elements 10(A) and (B) can be fixed to the resin lens frame 20 after the positional adjustment thereof is carried out by inclining the irradiating direction of the laser beam 30 at an angle sharper than 90° without being orthogonal to the optical axis O.

In each of the above-described first through third embodiments, since both the resin lens element 10 (10(A), 10(B)) and the resin lens frame 20 utilize amorphous polyolefin as a raw material, and the resin lens element 10 (10(A), 10(B)) is fixed (laser welded) to the resin lens frame 20 using the laser beam 30, positional shift (misalignment) of the resin lens element 10 when being fixed does not occur, unlike in the case where UV adhesive is utilized to fix a resin lens element to a resin lens frame. Accordingly, the resin lens element 10 (10(A), 10(B)) can be fixed to the resin lens frame 20 with high positional precision. Furthermore, the present invention also has the advantage of being able to securely and reliably fix an amorphous polyolefin miniature lens element to an amorphous polyolefin miniature lens frame in a short amount of time.

Moreover, since amorphous polyolefin has almost no water-absorbing properties, changes in optical quality upon a change in humidity are negligible.

Furthermore, since it is not necessary to provide space for an adhesive in the resin lens frame 20, miniaturization thereof can be achieved, and the lens frame can be further strengthened. Furthermore, the fixing strength can also be increased compared to that of UV adhesive.

In each of the first through third embodiments, it is possible to utilize, e.g., cycloolefin polymer (COP) as a specific amorphous polyolefin material.

Furthermore, in any of the first through third embodiments, the resin lens element 10 (10(A), 10(B)) and the resin lens frame 20 can have a non-rotationally symmetric shape.

Furthermore, the annular abutting surface 21 of the first embodiment, the inner circumferential surface 23 of the second embodiment, and the inner circumferential surface of the resin lens frame 20 of the third embodiment, which constitute abutting surfaces for abutting against the resin lens element 10, are surfaces which are orthogonal to the optical axis O or parallel to the optical axis O; however, these surfaces do not have to be orthogonal or parallel to the optical axis O, but can be inclined at an angle (other than 90°) with respect to the optical axis O. In such a case, the resin lens element 10 would be provided with abutting surfaces which are parallel to (which come into surface contact with) the above-mentioned abutting surfaces in the resin lens frame 20.

Note that an operator (i.e., the person operating a laser-beam irradiation device emitting the laser beam 30) can set the laser beam 30 so as to transmit through the resin lens frame 20 and be absorbed by the resin lens element 10 via adjustment of the wavelength of the laser beam 30. If the laser beam 30 is set in such a manner, the resin lens element 10 can be welded to the resin lens frame 20 without the need for forming the irradiation holes 22 in the resin lens frame 20, and regardless of the direction of irradiation of the laser beam 30.

Furthermore, in each of the first through third embodiments, a laser source other than a laser source which irradiates a YAG laser beam (e.g., an LD laser source or a $CO_2$ laser source) can be used as the laser source of the laser beam 30.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A fixing method for a resin lens in which a resin lens element is fixed to a resin lens frame, comprising:
    forming said resin lens element and said resin lens frame using amorphous polyolefin as a resin material therefor;
    forming an abutting surface in each of said resin lens element and said resin lens frame so as to mutually abut against each other;
    abutting said resin lens element and said resin lens frame mutually against each other at said abutting surfaces thereof; and
    laser welding said abutting surfaces to each other by irradiating a laser beam thereon.

2. The fixing method for a resin lens according to claim 1, wherein said mutually abutting surfaces comprise a first abutting surface formed on a peripheral edge portion of said resin lens element and extending in a direction orthogonal to an optical axis of said resin lens element, and a second abutting surface formed on an inner surface of said resin lens frame and extending in said direction orthogonal to the optical axis of said resin lens element,
    wherein said laser beam is irradiated onto said first and second abutting surfaces upon transmitting through said resin lens element.

3. The fixing method for a resin lens according to claim 1, wherein said abutting surfaces comprise a first abutting surface formed on the outer circumferential surface of said resin lens element and extending in a direction parallel to an optical axis of said resin lens element, and a second abutting surface formed on an inner surface of said resin lens frame and extending in said direction parallel to said optical axis, wherein said laser beam is irradiated onto said first and second abutting surfaces upon transmitting through irradiation holes formed in said resin lens frame, and said resin lens element.

4. The fixing method for a resin lens according to claim 3, wherein said irradiation holes are provided in said resin lens frame at locations in a circumferential direction about the optical axis.

5. The fixing method for a resin lens according to claim 4, wherein said irradiation holes extend in radial directions on a common plane orthogonal to the optical axis and aligned with the fixing position of said resin lens element.

6. The fixing method for a resin lens according to claim 5, wherein, before said abutting surfaces are laser welded, a position of said resin lens element in the optical axis direction is adjustable over a range in which said irradiation holes and said resin lens element overlap each other in the optical axis direction.

7. The fixing method for a resin lens according to claim 1, wherein said resin lens element and said resin lens frame both have a rotationally symmetric shape centered on an optical axis of said resin lens element.

8. The fixing method for a resin lens according to claim 1, wherein said amorphous polyolefin, for forming said resin lens element and said resin lens frame, comprises a cycloolefin polymer.

9. The fixing method for resin lens according to claim 1, wherein a laser source which irradiates said laser beam comprises one of a YAG laser source, an LD laser source and a $CO_2$ laser source.

* * * * *